United States Patent [19]
Geary

[11] 3,848,831
[45] Nov. 19, 1974

[54] FUSELAGE FLAPS FOR AN AIRCRAFT

[76] Inventor: Milford Geary, Box 26, Polo, Ill. 61064

[22] Filed: Oct. 23, 1973

[21] Appl. No.: 408,752

Related U.S. Application Data

[60] Continuation-in-part of Ser. No. 188,626, Oct. 12, 1971, abandoned, which is a division of Ser. No. 10,331, Feb. 11, 1970, Pat. No. 3,680,814.

[52] U.S. Cl. .......................... 244/45 R, 244/110 D
[51] Int. Cl. ........................... B64c 3/00, B64c 9/32
[58] Field of Search........ 244/13, 34 R, 45 R, 45 A, 244/47, 49, 87, 89, 110 B, 110 D, 113, 139; 114/126

[56] References Cited
UNITED STATES PATENTS

| | | | |
|---|---|---|---|
| 1,353,212 | 9/1920 | Boiler | 244/87 |
| 2,344,520 | 3/1944 | Olaszy | 244/113 |
| 2,444,291 | 6/1948 | Gray | 244/113 |
| 2,448,075 | 8/1948 | Bortner | 114/126 |
| 2,461,967 | 2/1949 | Devlin et al. | 244/113 |
| 3,125,313 | 3/1964 | Soderberg | 244/87 |
| 3,680,816 | 8/1972 | Mello | 244/46 |

FOREIGN PATENTS OR APPLICATIONS

| | | | |
|---|---|---|---|
| 477,844 | 1/1938 | Great Britain | 244/113 |

*Primary Examiner*—Trygve M. Blix
*Assistant Examiner*—Galen L. Barefoot
*Attorney, Agent, or Firm*—Wolfe, Hubbard, Leydig, Voit & Osann, Ltd.

[57] ABSTRACT

An aircraft includes fuselage flaps which are normally retracted and conform to the configuration of the fuselage and which may be extended outwardly of the fuselage to increase altitude control. The fuselage flaps comprise a first flap positioned rearwardly of the longitudinal center of gravity and hinged on its lower edge about an axis extending upwardly and rearwardly relative to the longitudinal axis of the fuselage. The fuselage flaps also include second and third flaps having their hinge axes aligned with the longitudinal axis of the fuselage and positioned fore and aft of the longitudinal center of gravity of the fuselage. The fuselage flaps further include a fourth and fifth flap aligned with the longitudinal axis of the fuselage at about the longitudinal center of gravity and the fifth flap being hinged to the rear portion of the fourth flap.

4 Claims, 7 Drawing Figures

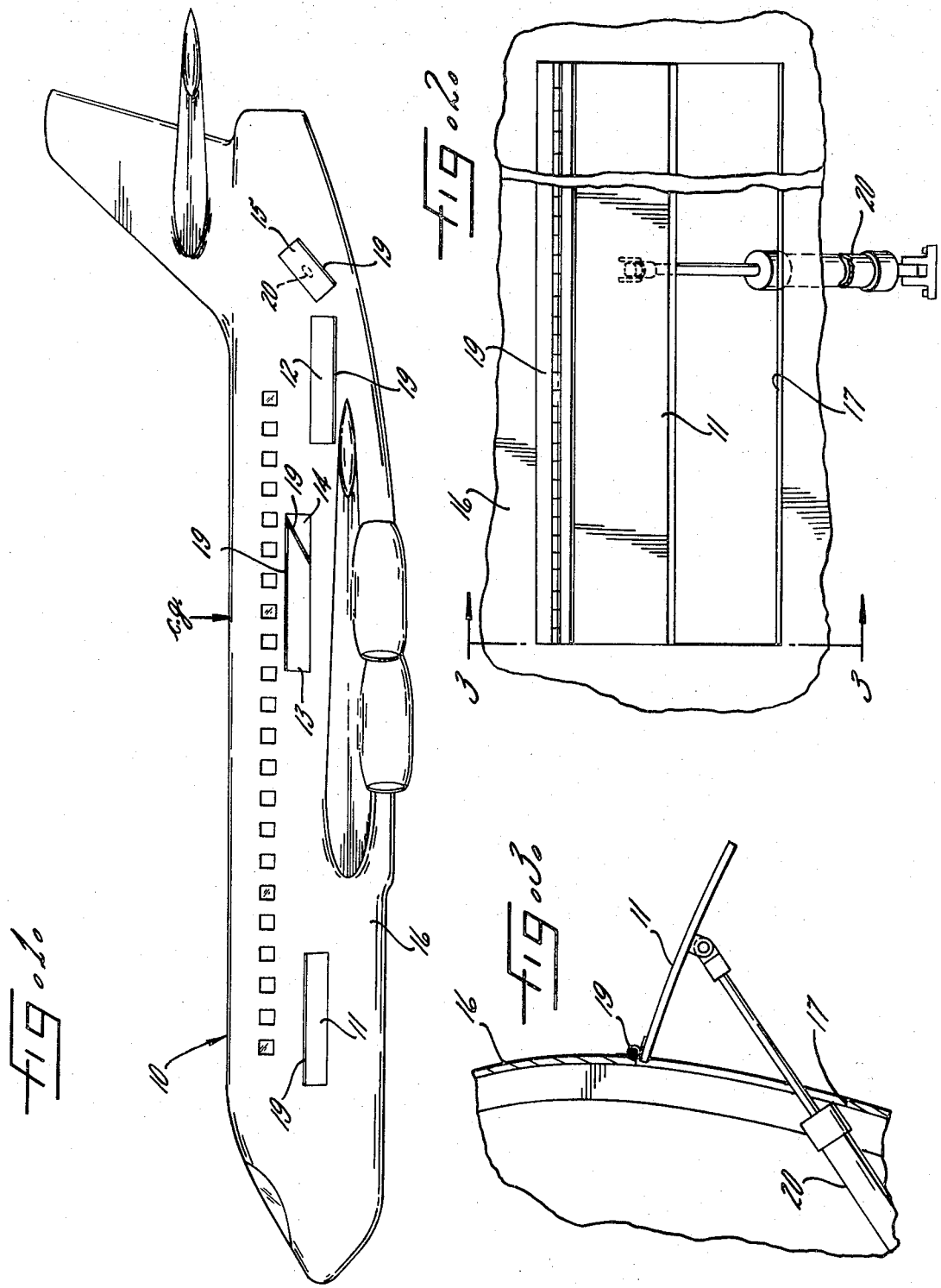

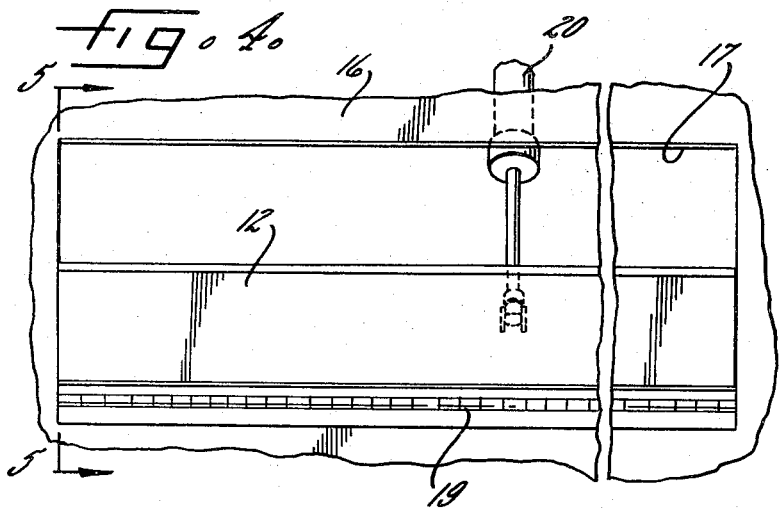
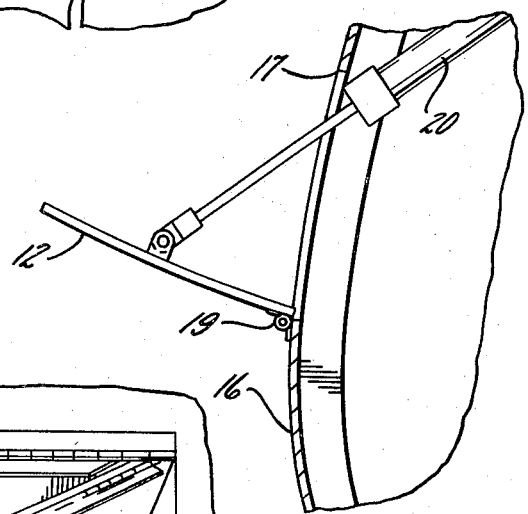
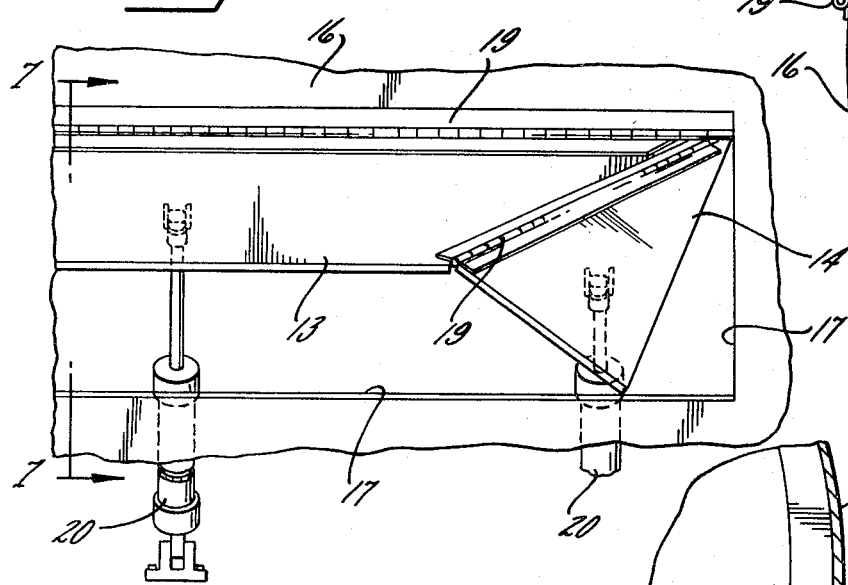
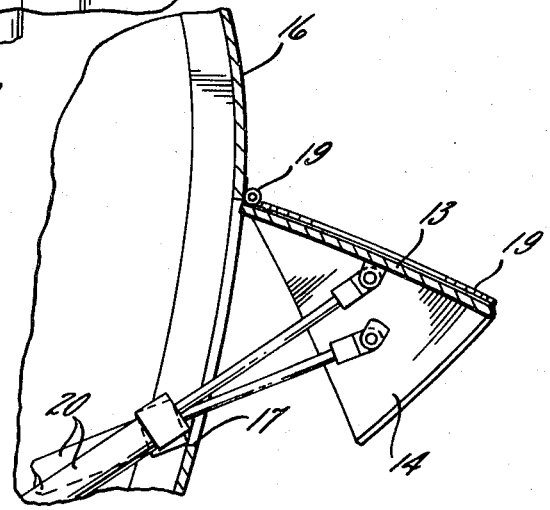

FUSELAGE FLAPS FOR AN AIRCRAFT

CROSS-REFERENCE TO RELATED APPLICATIONS

This application is a continuation-in-part of my application Ser. No. 188,626, filed Oct. 12, 1971 now abandoned, which, in turn, is a division of my application Ser. No. 10,331, filed Feb. 11, 1970 and now U.S. Pat. No. 3,680,814. The disclosure of said patent is incorporated herein by reference.

BACKGROUND OF THE INVENTION

This invention relates to control apparatus for an aircraft and, more particularly, to flaps which implement and increase aircraft flight control during critical flight conditions.

SUMMARY OF THE INVENTION

The general aim of the present invention is to provide new and improved fuselage flaps which normally conform to the configuration of the aircraft fuselage but which may be extended outwardly of the fuselage to achieve, maintain or alter aerodynamic flight characteristics so as to obtain safe and favorable flight conditions.

The invention also resides in the novel location and mounting of the fuselage flaps to achieve better altitude control under various conditions.

These and other objects and advantages of the invention will become more apparent from the following detailed description when taken in conjunction with the accompanying drawings.

BRIEF DESCRIPTION OF THE DRAWINGS

FIG. 1 is a side elevation of an exemplary aircraft equipped with fuselage flaps embodying the novel features of the present invention.

FIG. 2 is an enlarged elevation of one of the flaps and showing the flap in an extended position.

FIG. 3 is a fragmentary cross-section taken substantially along the line 3—3 of FIG. 2.

FIG. 4 is a view similar to FIG. 2 but showing a different fuselage flap.

FIG. 5 is a fragmentary cross-section taken substantially along the line 5—5 of FIG. 4.

FIG. 6 is a view similar to FIG. 2 but showing two additional fuselage flaps.

FIG. 7 is a fragmentary cross-section taken substantially along the line 7—7 of FIG. 6.

DETAILED DESCRIPTION OF THE PREFERRED EMBODIMENT

While the fuselage flaps of the present invention may be used in conjunction with wingless aircraft of the type disclosed in the aforementioned patent, they are shown in the drawings as incorporated in a conventional winged aircraft 10. In this instance, five flaps 11, 12, 13, 14 and 15 are shown as being provided on one laterally facing side of the aircraft fuselage 16 and it should be understood that these flaps are duplicated on the opposite side of the fuselage.

When retracted, all of the flaps 11 to 15 are received in openings 17 in the fuselage 16 and all conform substantially to the configuration of the fuselage (i.e., the flaps are substantially flush with the fuselage). Thus, the inner sides of the flaps are concave while their outer sides are convex. When extended, the flaps project outwardly from the fuselage as shown in FIGS. 3, 5 and 7. Each flap is mounted for swinging or pivoting between its retracted and extended positions by means of a hinge indicated at 19, the flaps 11, 12, 13 and 15 being hinged directly to the fuselage and the flap 14 being hinged to the trailing end of the flap 13. To swing the flaps between their positions, selectively operable power means in the form of hydraulic actuators 20 are connected between the flaps and the fuselage.

As shown in FIG. 1, the flaps 11, 12 and 13 all are mounted for swinging about an axis extending generally parallel to the longitudinal axis of the fuselage 16. The flaps 11 and 13 are hinged along their upper edges to swing upwardly to their extended positions while the flap 12 is hinged along its lower edge to swing downwardly to its extended position. The flap 11 is located forwardly of the longitudinal center of gravity c.g. of the aircraft 10, the flap 12 is located rearwardly of such center of gravity, and the flap 13 is located between the flaps 11 and 12 and generally above the wing.

As mentioned above, the flap 14 is pivoted on the trailing end of the flap 13 and is adapted to swing downwardly to its extended position about an axis which is inclined upwardly and rearwardly relative to the longitudinal axis of the fuselage 16. When in its retracted position, the flap 14 is disposed in the plane of the flap 13 and, when in its extended position, is inclined downwardly and rearwardly from the flap 13.

The flap 15 is located near the tail section of the aircraft 10 and is mounted to swing downwardly to its extended position about an axis which is inclined upwardly and rearwardly relative to the longitudinal axis of the fuselage 16. The hydraulic actuator 20 for this flap has been illustrated only schematically in FIG. 1 since this actuator is similar to the other actuators but is positioned to swing the flap about its inclined pivot axis.

By virtue of the flaps 11 to 15, the pilot may implement and increase altitude and speed control over the aircraft 10 at and during crucial flight conditions such as slow speeds during take off and landing when wing lift is minor in capacity and when the craft is nose heavy due to the forward progression of the center of gravity. During landing, the flaps 11, 12, 13 and 15 all should be fully extended and the flap 14 should be located at about a 90° angle relative to the flap 13. When thus positioned, the flaps decrease the forward speed of the aircraft since their substantial area imparts additional drag capacity to the aircraft and since the flaps 14 and 15 move broadwise through the air. Moreover, the flap 11 imparts additional lift surface to the aircraft, tending to raise the nose and cause the forward speed of the aircraft to be reduced even further. At the same time, the diagonal flap 15 forces the tail of the aircraft downwardly and is particularly effective because the flap 12 channels or funnels air to the flap 15 so as to increase the pressure against the latter flap. The flaps may be used to provide an extended glide or landing run where an approach is short and also an abrupt but soft touchdown when the runway is short or is overshot.

When taking off, the flaps 11, 12, 13 and 15 all should be fully extended and the flap 14 should be disposed in the same plane as the flap 13. The extended flaps thus augment the necessary tail down altitude and provide additional lift area for take off while the flap 14 creates less drag than is the case when it is extended during landing.

During an emergency condition such as when the aircraft might approach a mountain, the flaps may be extended and the speed of the engines increased. As a result of the extended flaps, the forward flight of the aircraft is reduced and lift is gained so as to help the pilot avoid the obstruction. The flaps 11, 12 and 13, when extended, oppose any deviating force causing the aircraft to roll and thus these flaps impart additional roll control and stability to the aircraft. At cruising altitude and under normal flight conditions, the flaps should be retracted and, by virtue of their conformance with the fuselage, the flaps do not add drag to the aircraft.

I claim as my invention:

1. Control apparatus for an aircraft having a fuselage, said control apparatus comprising a first flap located on a laterally facing side of the fuselage and positioned rearwardly of the longitudinal center of gravity of the aircraft, means mounting said flap on said fuselage for downward swinging from a retracted position to an extended position about an axis which is inclined upwardly and rearwardly relative to the longitudinal axis of said fuselage, a second flap located on said side of said fuselage and positioned between said first flap and said center of gravity, means mounting said second flap on said fuselage for downward swinging from a retracted position to an extended position about an axis extending generally parallel to the longitudinal axis of said fuselage, each of said flaps conforming substantially to the configuration of said fuselage when in its retracted position and projecting outwardly from said side of said fuselage when in its extended position, said second flap being located to channel air to said first flap when said flaps are in said extended positions, and mechanism connected between said flaps and said fuselage and selectively operable to swing said flaps between said positions.

2. Control apparatus as defined in claim 1 further including a third flap located on said side of said fuselage and positioned forwardly of the longitudinal center of gravity of said aircraft, means mounting said third flap on said fuselage for upward swinging from a retracted position to an extended position about an axis extending generally parallel to the longitudinal axis of said fuselage, said third flap conforming substantially to the configuration of said fuselage when in its retracted position and projecting outwardly from said side of said fuselage when in its extended position, and mechanism connected between said third flap and said fuselage and selectively operable to swing said third flap between its positions.

3. Control apparatus as defined in claim 2 further including a fourth flap located on said side of said fuselage and positioned between said second and third flaps, means mounting said fourth flap on said fuselage for upward swinging from a retracted position to an extended position about an axis extending generally parallel to the longitudinal axis of said fuselage, said fourth flap conforming substantially to the configuration of said fuselage when in its retracted position and projecting outwardly from said side of said fuselage when in its extended position, and mechanism connected between said fourth flap and said fuselage and selectively operable to swing said fourth flap between its positions.

4. Control apparatus as defined in claim 3 further including a fifth flap mounted on the trailing end of said fourth flap to swing downwardly between a retracted position and an extended position about an axis which is inclined upwardly and rearwardly relative to the longitudinal axis of said fuselage, said fifth flap being disposed in the plane of said fourth flap when in its retracted position and being inclined downwardly and rearwardly from the plane of said fourth flap when in its extended position, and mechanism connected between said fifth flap and said fuselage and selectively operable to swing said fifth flap between its positions.

* * * * *